United States Patent

[11] 3,579,879

| [72] | Inventor | Walter E. D. Samuels |
| | | Cleveland Heights, Ohio |
| [21] | Appl. No. | 843,483 |
| [22] | Filed | July 22, 1969 |
| [45] | Patented | May 25, 1971 |
| [73] | Assignee | Corning Glass Works |
| | | Corning, N.Y. |

[54] FLUIDIC CHARACTER DISPLAY DEVICE
9 Claims, 12 Drawing Figs.

[52] U.S. Cl. .................................................... 40/28
[51] Int. Cl. ............................................ G09f 11/00
[50] Field of Search ............................ 40/28, 28
(C), 37, 106.21

[56] References Cited
UNITED STATES PATENTS

| 609,915 | 8/1898 | Sibley | 40/28C |
| 1,322,542 | 11/1919 | Chauvet | 40/28C |
| 3,159,932 | 12/1864 | Polley | 40/28C |
| 3,315,388 | 4/1967 | Stahl | 40/28C |

Primary Examiner—Robert W. Michell
Assistant Examiner—Wenceslao J. Contreras
Attorneys—Clarence R. Patty, Jr., Walter S. Zebrowski and William J. Simmons, Jr.

ABSTRACT: A plurality of stacked movable slides is arranged such that a small movement of any one thereof from an inactivated position to an activated position will align information containing apertures of the moved slide with base apertures of the remaining slides to allow light to pass through the entire stack of slides and indicate a character that is outlined by the information apertures of the moved slide. A pair of pneumatic cylinders which are disposed at opposite ends of each of the slides move the slides between their inactivated and activated positions. A masking slide, which is moved from its inactivated to its activated position concurrently with the movement of any one of the plurality of slides to its activated position, prevents the display of any light when all of the plurality of slides are in their inactivated position.

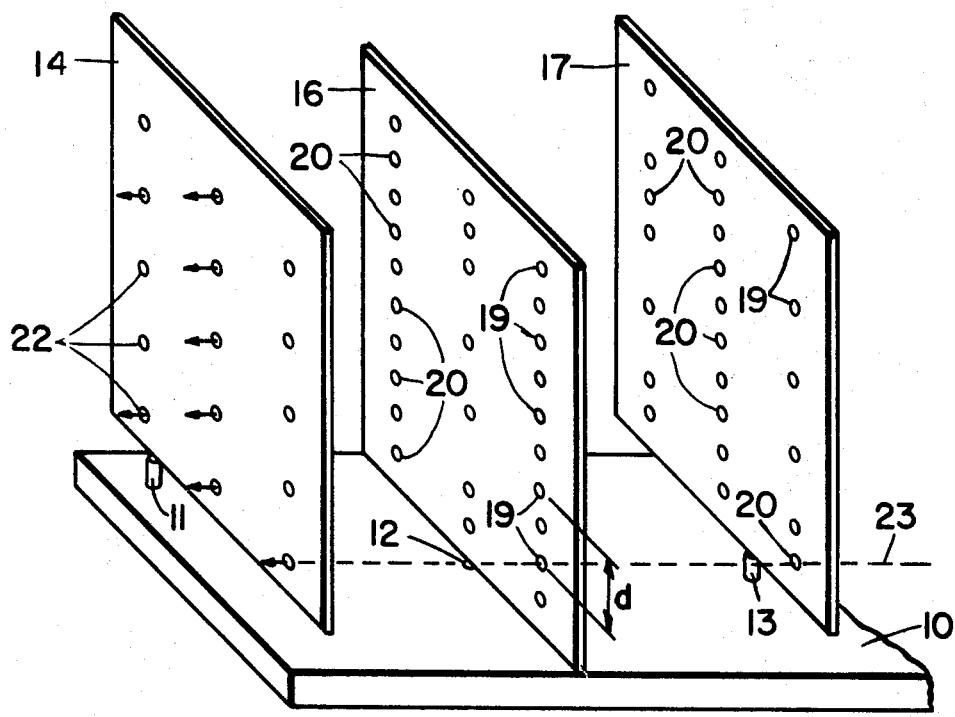
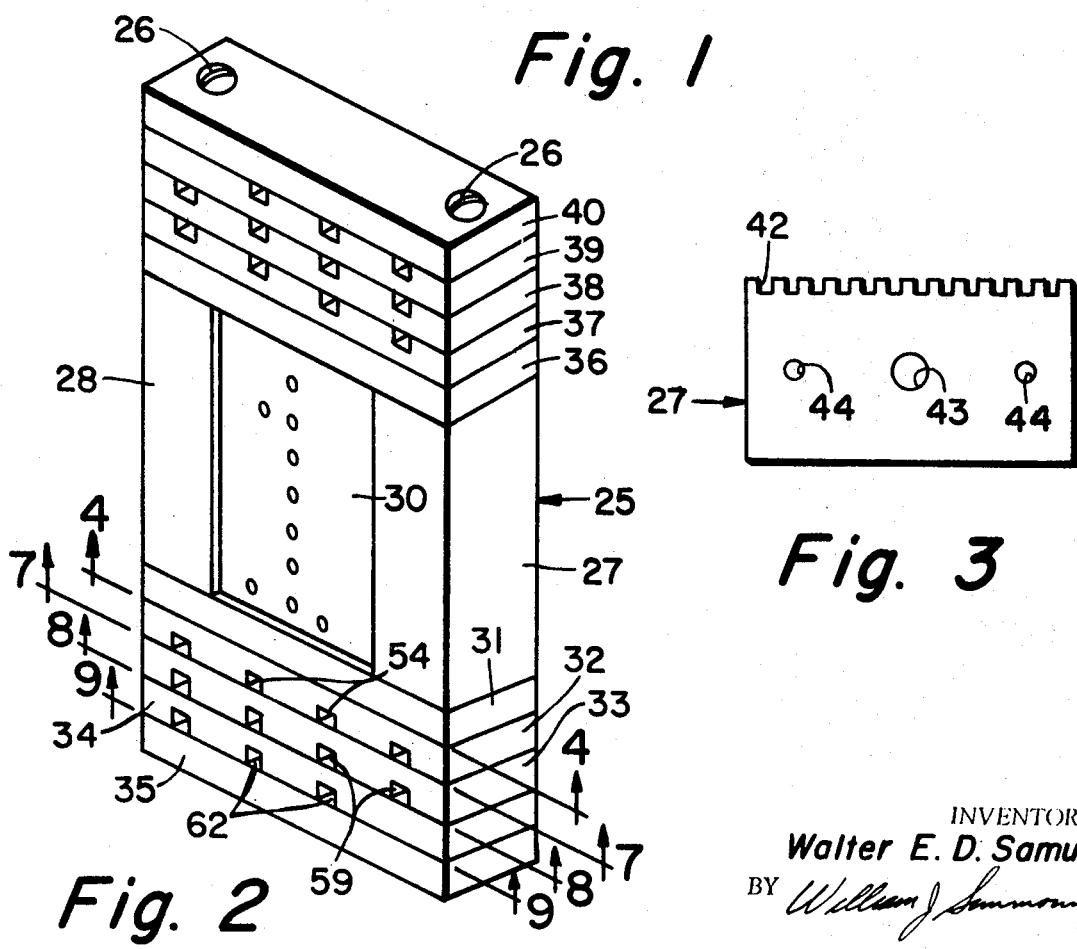

INVENTOR.
*Walter E. D. Samuels*

BY *William J. Simmons Jr.*

ATTORNEY 3,579,879

FLUIDIC CHARACTER DISPLAY DEVICE

BACKGROUND OF THE INVENTION

This invention relates generally to fluidic systems and more particularly to an improved output device for use in fluidic systems.

Fluidic circuits are being increasingly utilized in the fields of computation, automation and control. Many of these fluidic circuits require optical readouts or devices which provide a visual display describing the state of the fluidic system.

Some visual readout devices operate directly from fluid signals. One such display requires a plurality of shaped tubes, each of which forms one character. The characters are concealed in opaque liquid until needed. Another consists of 35 tubes containing lightweight pistons. Fluid pressure pushes certain ones of the pistons to the front of the tubes to build up the desired character. Still another type of fluidic display is provided by displacing a movable tape a distance which is necessary to position a character on the tape into a display area. Some of the disadvantages of these devices include complexity of construction, high cost, excessive signal input requirements, and the like.

SUMMARY OF THE INVENTION

It is therefore an object of this invention to provide a fluidic character display device that overcomes the disadvantages of the prior art.

A more specific object of this invention is to provide a fluidic character display device that is characterized by a small size and inexpensive construction.

A further object of the present invention is to provide a fast acting fluidic display device which is operated by fluid signals and which is capable of displaying an entire alphanumeric character display in a single viewing window.

Briefly, this invention relates to a fluidic character display device comprising a plurality of slides disposed adjacent one another in a stacked relationship, each slide containing a first plurality of light transmitting areas equally distributed in a series of base rows and a second plurality of light transmitting areas which are arranged to define characters, each slide defining a unique character. The second plurality of areas is disposed in alternate rows which are displaced a predetermined distance in a given direction from the rows of the first plurality of areas. The slides are capable of moving the predetermined distance along the aforementioned given direction between an inactivated position and an activated position. The second areas of any slide which is in the activated position become aligned with adjacent ones of the first plurality of areas of slides which are in the inactivated position. The display device further comprises a first plurality of pneumatic cylinders, one being disposed adjacent each of the slides for moving the same from its inactivated to its activated position. Fluid signals may be applied to each of the first plurality of pneumatic cylinders, thereby moving the respective slide to its activated position. Means are provided for returning and maintaining each of the slides in the inactivated position except during the application of a fluid signal to its associated cylinder.

BRIEF DESCRIPTION OF THE DRAWINGS

FIG. 1 is an oblique view of a portion of a display device which illustrates the principles of this invention.

FIG. 2 is an oblique view of a preferred embodiment of this invention.

FIG. 3 is an enlarged top view of the supports 27 and 28 of FIG. 2.

DETAILED DESCRIPTION

Figure 4:
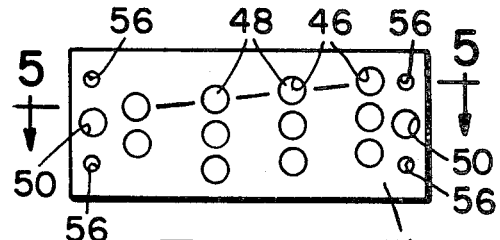
FIGS. 4, 7, 8 and 9 are views taken at lines 4—4, 7—7, 8—8 and 9—9 respectively, of FIG. 2.

FIG. 1 is an oblique view of a portion of a character display device which illustrates the principles of operation of this invention. A base member 10 has a plurality of cylindrical holes therein into which fit a plurality of pneumatic cylinders 11, 12 and 13. A masking slide 14 and character display slides 15 and 16 are so disposed on the base member 10 that each is in contact with a piston of one of the pneumatic cylinders 11, 12 and 13, respectively. Each of these slides contains a plurality of light transmitting areas which will hereinafter be referred to as apertures. The slides could be made from thin sheet metal having an aperture at each point through which light must pass, or they could be made in the form of a photographic negative, the main body of each slide consisting of an opaque plastic sheet and the light transmitting areas being transparent plastic. For the sake of clarity, the spacing between adjacent slides is greatly exaggerated, and a 3×5 aperture matrix is shown. It is preferable, however, to display numerals by a 5×7 or a 7×9 array of apertures.

When a fluid signal is applied to one of the pneumatic cylinders the piston therein will move in a direction such that the contacted slide will be separated from the base member 10. The slide which is set into motion stops when it contacts a mechanical stop (not shown) which is disposed adjacent the edge thereof opposite that edge which contacts the base member 10. For reasons to be hereinafter described, the pneumatic cylinders associated with adjacent slides are disposed different distances from the center of the base member 10.

Each of the character display slides contains five rows of base apertures 19, each row being separated by a distance $d$. Five rows which may contain information containing apertures 20 are located a distance one-half $d$ below each row of base apertures. The mechanical stop is located a distance one-half $d$ beyond the top edge of each of the slides 16 and 17 when such slides are in contact with the base member 10. The masking slide 14 contains five rows of apertures 22 which are located the same distance from the bottom thereof as that distance by which the information containing apertures 20 are separated from the bottom of the character display slides.

To display a particular character, the digital display slide bearing the proper information apertures to generate that character is raised a distance one-half $d$ by applying a fluid signal to its associated pneumatic cylinder. In FIG. 1, the slide 17 is raised so that the information containing apertures 20 are aligned with the base apertures 19 of all of the remaining display slides. At the same time that the slide 17 is raised, the masking slide 14 is raised so that the apertures 22 are also aligned with the base apertures 19 in all of the slides except slide 17. A single light source (not shown) may be disposed behind the plurality of slides, or an elongated light source may be disposed behind a plurality of character display devices. A portion of the light which passes through apertures in all of the slides to generate the numeral 1 is shown by a dashed line 23. Prior to reaching the slide 17, this light passes through base apertures in all of the preceding slides. It then passes through one of the information containing apertures 20 in the slide 17, one of the base apertures 19 in the slide 16, and thereafter through one of the apertures 22 in the masking slide 14. The arrows which extend from some of the apertures 22 in the slide 14 indicate all of the apertures from which light emanates to generate the numeral 1.

FIG. 2 is an oblique view of a preferred embodiment of the invention. In this FIG. a character display device 25 is shown as being constructed of a plurality of stacked parts which are secured together by a pair of elongated bolts 26. The central portion of the display device 25 consists of a pair of groove supports 27 and 28. As shown in greater detail in FIG. 3, the inwardly facing surfaces of the supports contain 12 grooves 42, 10 of which are adapted to receive character display slides for generating the numerals 0 through 9, and one of which receives the masking slide 14. The last slot at the viewing end of the display receives a viewing screen which is indicated in FIG. 2 by the numeral 30. This viewing screen may consist of such rear viewing screen materials as translucent plastic, etched glass, and the like. The hole 43 receives one of the bolts 25, and the holes 44 may be provided for receiving dowels which extend into holes in the plate 31 for alignment purposes.

Figure 5:
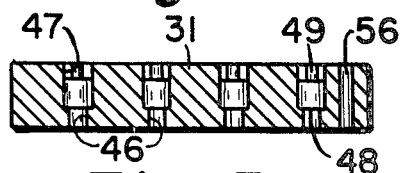
FIG. 5 is a cross-sectional view taken at line 5—5 of FIG. 4.

As shown in FIGS. 4 and 5, the pneumatic cylinders consist of a plurality of pistons 48 which are slidably mounted in cylindrical bores 47 in the plate 31. Each of the pistons 48 has a narrow extension 49 which is adapted to engage its respective slide. Furthermore, pistons which contact and move adjacent slides are located different distances from the center of the plate 31. This construction permits a piston having a relatively large area to actuate only one of the slides without contacting the adjacent slides. The bores 47 do not extend entirely through the plate 31; they connect to narrower holes 46 which provide a stop for the pistons 48 when they are in the inactivated condition. In FIG. 5, the extended portions 49 of the pistons extend to the surface of the plate 31. A pair of holes 56 at each end of the plate 31 receive dowels which also extend into the holes 44 of the supports 27 and 28. A pair of holes 50 in each of the plates 31 through 34 are aligned with the hole 43 in each of the supports 27 and 28 for receiving the bolts 26.

Figure 6:
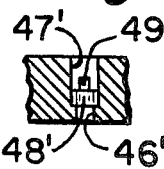
FIG. 6 is a cross-sectional view illustrating a modified form of piston for use in the cylinders of FIG. 5.

FIG. 6 shows a modified form of piston and cylinder construction; elements which are similar to previously described elements in FIG. 5 being indicated by primed reference numerals. In this modification the combined length of the piston 48' and the extended portion 49' is less than the length of the bore 47'. This modification is useful in those instances where the pressure of the fluid signal is insufficient to raise the character display slides by the piston arrangement of FIG. 5. The piston 48' is initially set in motion and gains momentum prior to its contacting a digital display screen.

Figure 7:
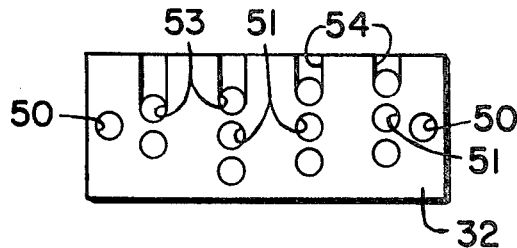
Figure 8:
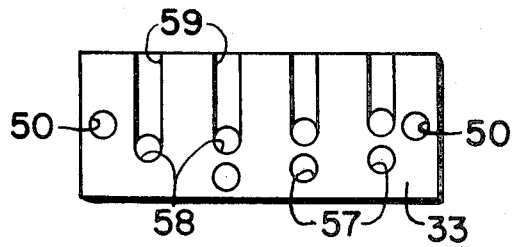
Figure 9:
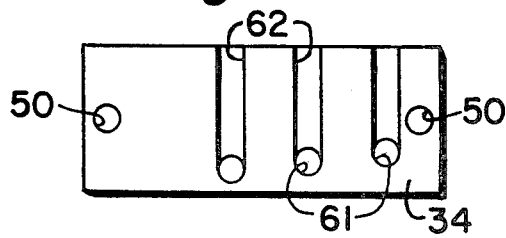

Fluid is applied to the pneumatic cylinders through passages in the plates 32, 33 and 34 which are shown in greater detail in FIGS. 7, 8, and 9, respectively. The plate 32 contains 11 holes 51 and 53 which are aligned with the 11 holes 46 in the plate 31. A plurality of channels 54 extend from the first row of holes 53 to the nearest edge of the readout device, which is the front of this device in the embodiment illustrated in FIG. 2. The plate 33 contains two rows of holes 57 and 58 which are aligned with the holes 51 of the plate 32. The holes 58 are connected by channels 59 to the edge of the plate 33. A plurality of channels 62 in the plate 34 are connected to a row of holes 61 which are aligned with the holes 57 in the plate 33. A cover plate 35 is attached to the plate 34. Fittings (not shown) may be glued or otherwise secured to the ends of the channels 54, 59 and 62 (see FIG. 2) for the purpose of connecting fluid conducting conduits to the display device.

The fluidic devices which supply the fluid signals necessary to operate the display device have two complementary output terminals. Therefore, the preferred embodiment of this invention utilizes the signal supplied by one of the output terminals to raise one of the slides to the display position and the complementary output signal to create a positive force for returning the slide to the initial condition only when such returning force is necessary. Thus, a first set of pistons is located below the character display slides and a second set is located above them. The pistons, cylinders and fluid supply passages which are utilized for returning the slides to their initial condition are formed in the plates 36 through 40 which are identical to the plates 31 through 35. Therefore, the plates 36 through 40 will not be described in detail. The entire assembly is secured together by the two bolts 26. Since the slides initially rest on the plate 31, the plate 36 acts as a mechanical stop for any of the slides which are moved away from the plate 31.

Figure 10:
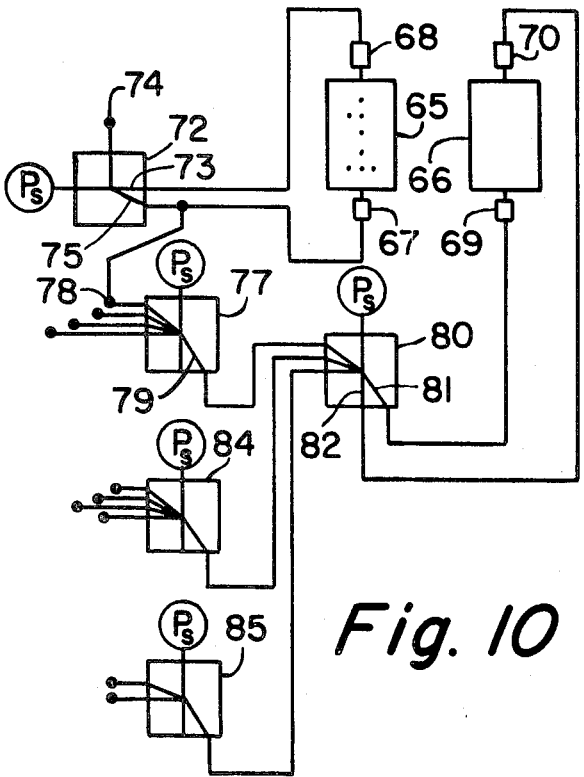
FIG. 10 is a schematic circuit diagram of a fluidic circuit for generating fluid signals for the masking slide.

FIG. 10 is a schematic circuit diagram of a fluidic circuit for generating the fluid signals which are necessary for moving the masking slide. To illustrate this principle of the invention, this FIG. includes a character display slide 54 and a masking slide 66. The pneumatic cylinders 67 and 68 are utilized to raise and lower the slide 65, whereas the pneumatic cylinders 69 and 70 are utilized to raise and lower the masking slide 66. As stated in connection with the description of FIG. 1, when any one of the character display slides is raised, the masking slide must be concurrently raised. The position of the slide 65 may be controlled by a monostable fluid amplifier 72. The power stream supplied by the source $P_s$ normally flows from the outlet passage 73 to the pneumatic cylinder 68 which maintains the slide 65 in its lower or unactivated state. When an input fluid signal is supplied to the terminal 74, the power stream is switched to the outlet passage 75, and a fluid signal is applied to the pneumatic cylinder 67, thus raising the slide 65 to the activated position. The signal appearing at the outlet passage 75 is also coupled to an input terminal 78 of a 4-input fluidic OR/NOR gate 77. This input signal diverts the power stream of the gate 77 to the unstable outlet passage 79 which is connected to one of the control passages of a 3-input fluidic OR/NOR gate 80. The signal from the outlet passage 79 diverts the power stream to the unstable outlet passage 81 which is connected to the pneumatic cylinder 69. Thus, when a fluid signal is applied to the cylinder 67, a fluid signal will also be applied to the cylinder 69. When the signal at the terminal 74 ceases, causing a fluid signal to be applied to the cylinder 68, the OR/NOR gates 77 and 80 will return to their stable conditions and a fluid signal will be applied from the stable outlet passage 82 of the gate 80 to the cylinder 70.

The masking slide 66 must be activated when any of the digital display screens is activated. Therefore, to display the digits 0 through 9, for example, the cylinders 69 and 70 must be controlled by 10 different fluidic signals. This can be accomplished by utilizing two 4-input OR/NOR gates 77 and 84 and one 2-input fluidic OR/NOR gate 85. The outputs from the gates 77, 84 and 85 are applied to the gate 80. A signal appearing at the input terminal of any of the gates 77, 84 and 85 will cause an output fluidic signal to be generated at the outlet passage 81, thereby raising the masking slide 66.

Figure 11:
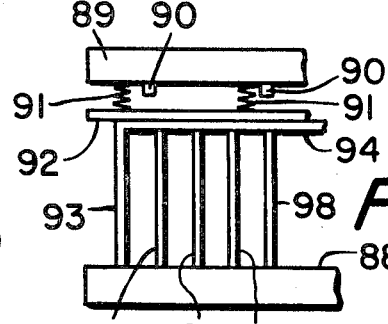
FIGS. 11 and 12 illustrate a modified embodiment of this invention.
Figure 12:
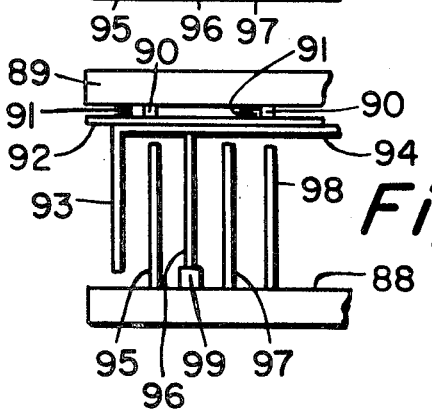

FIGS. 11 and 12 illustrate an alternative apparatus for activating the masking slide and for returning all of the slides to their inactivated position in the absence of any input signal. FIG. 11 illustrates the alternative embodiment in the activated condition, whereas FIG. 12 illustrates this embodiment in the activated condition. The plurality of digital display screens 95 through 98 rest on a base member 88 when in their inactivated condition. A masking slide 93 is shown to include an additional section 94 which extends perpendicular from the screen and is disposed above all of the remaining slides 95 through 98. A support member 89 supports a pair of mechanical stops 90 and a pair of springs 91 which are affixed to a movable stop 92. As illustrated in FIG. 12, a piston 99 causes the slide 96 to be raised into its activated position. The activated slide 96 contacts the section 94, thereby moving the masking slide 93 to its activated position. The length of the mechanical stops 90 are such that the slides 93 and 96 move the proper distance before stopping. When the fluid signal ceases, the piston 99 recedes into the member 88 and the spring biased stop 92 returns the slides 93 and 96 to their initial condition.

The alternative embodiment illustrated in FIGS. 11 and 12 does not require a second cylinder to return the screens to their initial conditions since this function is performed by the movable stop 92. Alternatively, each of the screens could be biased toward their initial conditions by separate springs, in which case a piston would have to be provided to move the masking slide as well as each of the character display slides.

I claim:
1. A fluidic character display device comprising:
   a plurality of slides disposed adjacent one another in a stacked relationship, each of said slides containing a first plurality of light transmitting areas equally distributed in a series of base rows and a second plurality of light transmitting areas which are arranged to define characters, said second plurality of areas of each slide defining a unique character, said second plurality of areas being disposed in alternate rows which are displaced a predetermined distance in a given direction from the rows of said first plurality of areas, said slides being movable said predetermined distance along said given direction between an inactivated position and an activated position, the second areas of any slide which is in the activated position being aligned with adjacent ones of said first plurality of areas of slides which are in the inactivated position, a first plurality of pneumatic cylinders, one being disposed adjacent each of said slides for moving the same from its inactivated to its activated position, means for applying fluid signals to each of said first plurality of pneumatic cylinders, thereby moving the respective slide to its activated position, and first returning means for returning and maintaining each of said slides in the inactivated position except during the application of a fluid signal to its associated cylinder.

2. A fluidic character display device in accordance with claim 1 which further includes a masking slide having an array of light transmitting areas which is equal in number to said first plurality of areas and which are aligned with said second plurality of areas, means for moving said masking slide said predetermined distance from its inactivated position to its activated position when any one of said plurality of slides is in its activated position, and second returning means for returning and maintaining said masking slide in the inactivated position when all of said plurality of slides are in their inactivated positions.

3. A fluidic character display device in accordance with claim 2 wherein said means for moving said masking slide comprises a first pneumatic cylinder disposed adjacent said masking slide and fluidic circuit means for supplying a fluid signal to said masking slide pneumatic cylinder during the application of a fluid signal to any of said first plurality of pneumatic cylinders.

4. A fluidic character display device in accordance with claim 3 wherein each of said first plurality of pneumatic cylinders is connected to one of the outlet passages of a respective one of a plurality of fluid amplifiers, a fluidic OR/NOR gate having a plurality of control channels, an unstable outlet passage and a stable outlet passage, means connecting the outlet passage of each of said fluid amplifiers to the control passages of said OR/NOR gate, and means connecting the unstable passage of said OR/NOR gate to said masking slide pneumatic cylinder.

5. A fluidic character display device in accordance with claim 3 wherein said first and second returning means comprises a second plurality of pneumatic cylinders, one being disposed adjacent each of said plurality of slides and said masking slide, said second plurality of cylinders being oppositely disposed with respect to said first plurality of cylinders, a pneumatic cylinder oppositely disposed adjacent said masking slide with respect to said first pneumatic cylinder, said second plurality of cylinders and said second pneumatic cylinder being capable of moving said slides from their activated to their inactivated positions, means for applying fluid signals to each of said second plurality of cylinders in the absence of the application of a fluid signal to the respective ones of said first plurality of cylinders, and means for supplying a fluid signal to said second pneumatic cylinder in the absence of the application of a pneumatic cylinder to said first pneumatic cylinder.

6. A fluidic character display device in accordance with claim 3 wherein said plurality of pneumatic cylinders comprises a housing having a plurality of bores therein, a movable piston situated in each of said bores, the central portion of a first end of each of said pistons being in contact with a respective one of said slides when said one slide is in its inactive position.

7. A pneumatic cylinder in accordance with claim 3 wherein said plurality of pneumatic cylinders comprises a housing having a plurality of bores therein, a piston disposed in each of said bores, the central portion of a first end of each of said pistons being adjacent and displaced from a respective one of said slides when said one slide is in its inactivated position.

8. A fluidic character display device in accordance with claim 2 wherein said masking slide includes a section projecting perpendicular from one end thereof and extending adjacent and in contact with said first plurality of slides when said first plurality of slides are in their inactivated position, said masking slide being displaced to its activated position when any of said plurality of slides is displaced to its activated position due to the movement imparted to said extended portion by the activated one of said plurality of slides.

9. A fluidic character display device in accordance with claim 1 wherein said first returning means comprises a second plurality of pneumatic cylinders, one being disposed adjacent each one of said plurality of slides, said second plurality of cylinders being oppositely disposed with respect to said first plurality of cylinders, said second plurality of cylinders being capable of moving said slides from their activated to their inactivated positions, and means for applying fluid signals to each of said second plurality of cylinders in the absence of the application of a fluid signal to the respective ones of said first plurality of cylinders.